United States Patent Office 3,441,647
Patented Apr. 29, 1969

3,441,647
1,2α;16,17α-BISMETHYLENE-Δ$^{4,6}$-PREGNADIENES
Friedmund Neumann and Rudolf Wiechert, Berlin, Germany, assignors to Schering Aktiengesellschaft, Berlin, Germany
No Drawing. Filed Sept. 21, 1966, Ser. No. 580,907
Claims priority, application Germany, Sept. 30, 1965, Sch 37,813
Int. Cl. A61k 17/00; C07c 169/26
U.S. Cl. 424—242
9 Claims

ABSTRACT OF THE DISCLOSURE

A compound of the following formula:

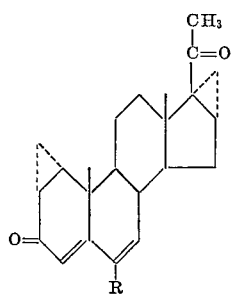

wherein R is halogen, the treatment of gynecological disorders therewith, and a method of preparing the above compound by subjecting 1,2α-methylene-Δ$^{4,6,16}$-pregnatriene-3,20-dione to a methylenating reaction, treating the recovered 1,2α;16,17α-bismethylene compound with a percarboxylic acid to epoxidize the Δ$^6$-double bond and subjecting the 6,7α-oxido compound formed where (a) R designates a member selected from the group consisting of chlorine, bromine and iodine to a treatment with the corresponding hydrohalic acid under simultaneous splitting of both cyclopropane rings and the epoxide ring to produce the 1α,16α-bis(halomethyl)-6-halo-Δ$^{4,6}$-3-keto compound, (b) R designates fluorine, to a treatment with hydrofluoric acid to produce the 6β-fluor-7α-hydroxy-1,2α;16,17α-bismethylene intermediate and reacting the intermediate with a member selected from the group consisting of hydrochloric, hydrobromic and hydroiodic acids whereby the 7α-hydroxy group is eliminated, converting the resulting compound into the 1α,16α-bis(halomethyl)-6-fluor-Δ$^{4,6}$-3-keto compound, and thereafter treating the 3-keto compound with a base whereby the 1α- and 16α-halomethyl groups are closed to form cyclopropane rings.

---

The present invention relates to novel therapeutic agents. More particularly, the present invention relates to 1,2α;16,17α-bismethylene-Δ$^{4,6}$-pregnadienes as well as to their preparation and the formulation thereof as therapeutically useful compositions.

The compounds of the invention can be represented by the following formula:

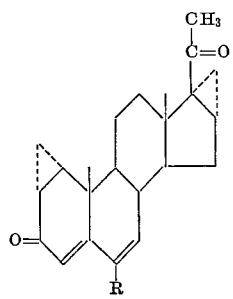

wherein R is hydrogen or halogen.

The compounds corresponding to the above entitled formula demonstrate unexpected and very useful properties. They possess strong ovulation inhibiting activity and a limited gestational potency making them useful in the treatment of complaints associated with the climacteric individual.

The compounds described herein can be prepared by converting the Δ$^{16}$-double bond in the corresponding Δ$^{16}$-steroid with R designating hydrogen by methylenating the same to produce the 1,2α; 16,17α -bismethylene-compound. The same bismethylene compound is treated in the conventional manner with a percarboxylic acid to epoxidize the Δ$^6$-double bond and the primarily recovered 6,7α-oxido compound treated for producing the compound where R has the desired meaning.

(a) If R designated chloride, bromine or iodine, the oxido compound is treated with the corresponding hydrohalic acid under simultaneous splitting of both the cyclopropane and epoxide rings to form the 1α,16α-bis(halomethyl)-6-halo-Δ$^{4,6}$-3-keto compound, or (b) Where R designates fluorine, the oxido compound is treated with hydrofluoric acid whereby 6β-fluor-7α-hydroxy-1,2α;16,17α-bismethylene is formed as an intermediate. The intermediate is reacted with one of hydrochloric, hydrobromic or hydroiodic acid whereby the 7α-hydroxy group is eliminated. The 1α,16α-bis(halomethyl)-6-fluor-Δ$^{4,6}$-3-keto compound is formed in the known manner from this latter compound, and thereafter the 1α- and 16α-halomethyl groups are closed to cyclopropane rings using bases.

The methylenation of the Δ$^{16}$-double bond can be advantageously carried out in various ways including the following:

(A) Diazomethane is added and the recovered [Δ$^{1'}$-pyrazolino]-4',3';16,17α-steroid.

(a) At high temperatures, for instance 220–250° C. and suitably under high vacuum or under use of a high boiling base, as for example quinoline, or aniline as solving agent, and in the presence of an inert gas, as for example nitrogen, or (b) Through the action of an acid catalyst, for instance, fluoro boric acid, borontrifluoride etherate or perchloric acid, in an organic solvent, for instance acetone at room temperature converted into the corresponding 16,17α-methylene compound, or (B) The methylene group directly introduced by means of dimethyl-sulfoxoniummethylide (according to the process described in German patent specification No. 1,183,500).

The preparation of the compounds wherein R designates halogen includes the preparation of the 6,7α-oxido compound. For this purpose, the Δ$^6$-double bond is epoxidized by treatment with a suitable percarboxylic acid such as peracetic acid, perbenzoic acid, monoperphthalic acid, or, as in this case the reaction is a selective one, preferably with m-chlor-perbenzoic acid.

In those instances where in the final products R designates chlorine, bromine or iodine, the 6,7α-oxido compound is split with the corresponding hydrohalic acid. The splitting reaction is advantageously carried out in a solvent medium, using therefor preferably an organic acid, as for example glacial acetic acid. Under these reaction conditions, the primarily recovered 7α-hydroxy group under splitting off of water is eliminated to form the desired Δ$^6$-double bond. Simultaneously both cyclopropane rings are split through the addition of hydrogen halide. The recovered 1α,16α-bis(halomethyl) compound is thereafter through treatment with a base converted into the 1,2α;16,17α-bismethylene compound. Suitable agents for splitting off the hydrogen halide are the inorganic bases, as for instance, sodium or potassium hydroxide, sodium or potassium carbonate or bicarbonate, calcium carbonate or aluminium oxide. The reaction is advantageously carried out in alcoholic solution, as for example methanol, and preferably at boiling temperatures. If aluminium oxide is used, the 1α,16α-bis(halomethyl) compound is advantageously dissolved in a preferably nonpolaric solvent, as for example benzene, the solution is added to aluminium oxide, and the slurry is stored for several hours at room temperature. It is also possible for the 1α-halomethyl group to be selectively transformed into the 1,2α-methylene group by heating the 1α,16α-bis(halomethyl) compound in an organic base as for instance collidine, lutidine, pyridine, quinoline, aniline, alkyl amines, alkanol amines, etc. Thereafter the recovered compound is treated with an inorganic base as above set out.

Where in the end product R designates fluorine, the 6,7α-oxido compound is treated with hydrofluoric acid advantageously in an organic solvent or solvent mixture, preferably dimethylformamide, to split the oxido compound. In this case, the 6β-fluor-7α-hydroxy compound thus formed is treated with a mineral acid to split off water. As mineral acids there can be employed hydrochloric, hydrobromic or hydroiodic acid advantageously dissolved in an organic acid, preferably in acetic acid. Under these reaction conditions in addition to the splitting off of water both cyclopropane rings are split, which following treatment with bases reform cyclopropane rings.

The compounds of this invention possess strong ovulation inhibiting properties and poor gestational activity, this being demonstrated in the table which follows. In the table, the activity of 6-chlor-1,2α;16,17α-bismethylene-$\Delta^{4,6}$-pregnadiene-3,20-dione (compound in accordance with the invention) is compared with the known ovulation inhibitory agents. The gestational activity was evaluated by the known peroral Clauberg test, and the ovulation inhibitory activity evaluated by tube inspection. For the inhibition of ovulation that dose ($WD_{50}$) which following oral administration eliminates ovulation in 50% of the animals (normal female rats) is reported. As a measure of the gestational acivity there is taken the minimum amount of compound which produces a positive Clauberg test in infantile rabbits.

TABLE

| Compound | Clauberg p.o. threshold value (mg.) | Ovulation inhibition p.o. $WD_{50}$ (mg.) |
| --- | --- | --- |
| 6-chlor-12α;16,17α-bis-methylene-$\Delta^{4,6}$-pregnadiene-3,20-dione (I) | ¹ 0.3 | 0.3 |
| 6-chlor-1,2α-methylene-$\Delta^{4,6}$-pregnadiene-17α-ol-3,20-dione-17-acetate (II) | 0.01 | |
| 6-chlor-$\Delta^{4,6}$-pregnadiene-17α-ol-3,20-dione-17-acetate (III) | 0.03 | 1–3 |
| 17α-ethinyl-19-nor-testosterone (IV) | 0.1 | 3 |
| 17α-ethinyl-19-nor-testosterone-acetate (V) | 0.03 | 3 |
| 17α-ethinyl-$\Delta^{5(10)}$-19-nor-androstene-17β-ol (VI) | 1 | 3–10 |

¹ Inactive.

The table clearly shows the outstanding anti-ovulatory activity and the substantial absence of gestational activity of the compound I, a dose of 0.3 mg. being ineffective to produce gestational activity (positive Clauberg) and being sufficient to produce inhibition of ovulation. In contrast the known gestation-ovulation inhibitors (II–VI) have ovulation inhibitory activity only at doses which are ten to one hundred times higher than the threshold dose producing a positive Clauberg test. Compound I, however, produces inhibition of ovulation at a dose at which gestational activity has not been initiated. These properties make the new compounds outstanding agents for use in the treatment of conditions associated with the climacteric.

The compounds are also suitable for use in those conditions where conception is to be prevented, as for example, after a serious illness.

Still further the compounds of the invention are effective therapeutic agents in various gynecological conditions as, for example, dysmenorrhea, amenorrhea, endometriosis, glandular-cystic hyperplasia, cycle restoration and functional sterility.

The 1,2α;16,17α-bismethylene-$\Delta^{4,6}$-pregnadienes of the invention can be used per se as well as in combination with other hormones as for instance estrogens as, for example, ethinyl estradiol.

The compounds of this invention are active when administered orally or parenterally. The novel compounds; for therapeutic use are incorporated into tablets, capsules, elixirs, dragees, granulates, suspensions, solutions and the like.

For example, when the novel compounds are incorporated as the active ingredient in a tablet, the tablet ingredients must be compatible with the active agent and non-inhibitive with respect to the action of the active agent. Useful inert diluents or fillers which can be used in the tablet preparation are lactose, dextrose, sucrose, kaolin starch, etc. Useful binders are gum acacia, zein, gelatin, sodium carboxy methyl cellulose, etc. Other ancillary ingredients, such as lubricants, e.g., calcium stearate, mineral oil, flavorants, etc., can be present in the tablet. Tablets can be prepared by mixing together the active ingredient, binder, filler and lubricant while in a moist condition, granulating and compressing the mixture into tablets. If desired, the active ingredient, binder, filler, etc. can be encapsulated.

In clinical use, the concentration of active ingredient is dependent on the form of application. Thus in preparing tablets, capsules, elixirs, or other dosage forms intended for oral administration, the formulation should preferably contain 0.1–10 mg. of active drug per dosage unit. Solutions and suspensions intended for parenteral injection should preferably contain 1–20 mg. of active drug per dosage unit.

The preparation of the starting materials employed in the production of the novel compounds of the invention has not hitherto been described in the literature and can be carried out, for example, as follows:

10 g. 1,2α-methylene-$\Delta^{4,6}$-pregnadiene-17α-ol-3,20-dione-17-acetate (prepared as set out in DAS 1,096,353) was heated to boiling with 150 ml. distilled quinoline for 5 hours in a nitrogen atmosphere. Following cooling, the mixture was stirred into hydrochloric acid acidified ice water, extracted with ether and the organic phase washed with water until neutral. After the washed organic phase had been dried over sodium sulfate, and evaporated to dryness, the residue was crystallized out of acetic ether. 5.2 g. 1,2α-methylene-$\Delta^{4,6,16}$-pregnatriene-3,20-dione having a melting point of 279–280.5° C. were recovered. UV: $\epsilon_{239}=14,600$; $\epsilon_{282}=20,800$ (methanol).

The invention is illustrated by the following examples with regard to certain preferred embodiments of the invention.

Example 1

3.2 g. of 1,2α-methylene-$\Delta^{4,6,16}$-pregnatriene-3,20-dione dissolved in 65 ml. methylene-chloride were added to 100 ml. etheric diazomethane solution prepared from 24.5 g. nitrosomethylurea and the resulting mixture stored for 3 days at room temperature. Thereafter the polymeric material which had separated out was filtered off and the filtrate evaporated to dryness in vacuum. Following treatment with isopropylether 3.4 g. crude [$\Delta^{1'}$-pyrazolino-]-4',3',16,17 - [1,2α - methylene - $\Delta^{4,6}$ - pregnadiene - 3,20-dione having a melting point of 180–182° C. (decomp.) were recovered. UV: $\epsilon_{280}=19,000$ (methanol).

3.8 g. of the pyrazolino compound were added in increments and under stirring, to a solution of 105 ml. acetone and 1.5 ml. 70% perchloric acid. After the addition had been completed, the mixture was poured into ice-water, the precipitate which settled out removed by suction, washed and dried. Following chromatographic filtration through silica gel, 2.1 g. 1,2α;16,17α-bis-methylene-$\Delta^{4,6}$-pregnadiene-3,20-dione having a melting point of 198–199.5° C. were recovered. UV:$\epsilon_{282}$=21,200 (methanol).

Example 2

A further possibility for the methylenation is the conversion of the $\Delta^{16}$-compound with dimethylsulfoxonium-methylide.

To this end, 1.58 g. trimethylsulfoxoniumiodide and 345 mg. sodium hydride in the form of a 50% oil suspension were admixed under stirring, at room temperature, and in a nitrogen atmosphere for 30 minutes with 30 ml. dimethylsulfoxide. Thereafter 1.93 g. 1,2α-methylene-$\Delta^{4,6,16}$-pregnatriene-3,20-dione were added and the resulting mixture stirred for 16 hours at room temperature.

This latter mixture was then poured into weakly acid (acetic acid) ice water, the precipitate which formed separated by suction, washed and dried. On crystallization from methanol, 1.23 g. 1,2α;16,17α-bis-methylene-$\Delta^{4,6}$-pregnadiene-3,20-dione having a melting point of 198–199° C. were recovered. UV:$\epsilon_{282}$=21,300 (methanol).

Example 3

1.57 g. 1,2α;16,17α - bismethylene - $\Delta^{4,6}$ - pregnadiene-3,20-dione in 15 ml. ethylene-chloride and 1.9 g. 85% m-chlorperbenzoic acid in 10 ml. ether were stored together for 5 days at room temperature. The mixture was then diluted with methylene-chloride and washed with weak sulfuric acid Iron II-sulfate solution, sodium bicarbonate solution and water. The washed solution was then dried over sodium sulfate and evaporated to dryness. The residue was crystallized out of acetic ester. There were recovered 1.4 g. 1,2α;16,17α-bismethylene-6,7α-epoxy-$\Delta^4$-pregnene-3,20-dione having a melting point of 251–252° C. UV:$\epsilon_{216}$=12,200; $\epsilon_{230}$=12,100 (methanol).

1.24 g. of the epoxide were dissolved in 62 ml. glacial acetic acid, saturated with dry hydrogen chloride gas and the resulting solution stored for 20 hours at room temperature. Thereafter, the mixture was stirred into ice water, the precipitated material separated by suction, washed and dried. 1.45 g. 6-chlor-1α,16α-bis(chlormethyl)-$\Delta^{4,6}$-pregnadiene-3,20-dione were recovered which was suitable for use as the crude material.

1.45 g. of the crude chloromethyl compound were heated to boiling in 50 ml. collodine for 30 minutes under nitrogen. Ether was then added to the mixture and it was washed with dilute hydrochloric acid and water. Following drying over sodium sulfate, the washed ether phase was evaporated to dryness using vacuum. The remaining residue was chromatographed over silica gel with a benzene-acetic ether mixture (49:1). There were crystallized out of acetic ether, 700 mg. 6 - chlor - 16α chlormethyl - 1,2α - methylene - $\Delta^{4,6}$ -pregnadiene - 3,20-dione having a melting point of 221.5–222.5° C. UV: $\epsilon_{282}$=15,700 (methanol).

420 mg. of the 16α-chlormethyl compound and 126 mg. potassium hydroxide in 42 ml. methanol were heated for 16 hours under reflux. The resulting mixture was diluted with methylene chloride, washed till neutral with water and dried over sodium sulfate. Following evaporation to dryness, the remaining residue was crystallized out of acetic ether. 330 mg. 6-chlor-1,2α;16,17α-bismethylene-$\Delta^{4,6}$-pregnadiene-3,20-dione having a melting point of 231–232° C. were thusly recovered. UV:$\epsilon_{282}$=17,000 (methanol).

Example 4

3 g. 1,2α;16,17α-bismethylene-6,7α-epoxy-$\Delta^4$-pregnene-3,20-dione were stirred for 5 hours at room temperature with a solution of 15 ml. hydrofluoric acid in 15 ml. dimethyl formamide. The resulting mixture was stirred into potassium bicarbonate solution, extracted with methylene-$\Delta^4$-pregnene-7α-ol-3,20-dione was dissolved in dried over sodium sulfate. Following evaporation to dryness, the residue comprising 6β-fluor-1,2α;16,17α-bismethylene-$\Delta^4$-pregnene-7α-ol-3,20-dione was dissolved in 30 ml. glacial acetic acid and saturated with dry hydrogen chloride gas. Following a 20 hour reaction period, the reaction mixture was poured into ice water. The precipitate which formed was suctioned off, taken up in methylenechloride, and washed with sodium bicarbonate solution and water. The washed extract was dried over sodium sulfate and evaporated to dryness in vacuum. The thusly recovered crude 6 - fluor - 1α,16α - bis(chlormethyl)-$\Delta^{4,6}$-pregnadiene-3,20-dione was taken up in 300 ml. methanol and thereafter refluxed with 1.05 g. potassium hydroxide for 16 hours. Following further working up as set out in Example 3, the residue was chromatographed over silica gel with a benzene-acetic ether mixture (19:1). There were recovered by crystallization out of acetic ether, 1.35 g. 6-fluor-1,2α;16,17α-bismethylene-$\Delta^{4,6}$-pregnadiene-3,20-dione. UV: $\epsilon_{282}$=17,300 (methanol).

Example 5

Following Example 4 the crude 6-fluor-1α,16α-bis(chlormethyl)-$\Delta^{4,6}$-pregnadiene-3,20-dione was taken up in 120 ml. benzene and then added to 80 g. aluminium oxide. The resulting mixture was stored for 20 hours at room temperature. Thereafter the 6-fluor-1,2α;16,17α-bismethylene-$\Delta^{4,6}$-pregnadiene - 3,20 - dione formed was extracted with benzene and the extract evaporated to dryness in vacuum.

We claim:
1. A compound of the following formula:

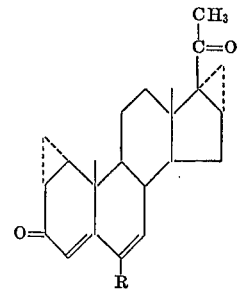

wherein R is halogen.

2. A compound according to claim 1 designated 6-chlor - 1,2α;16,17α - bismethylene - $\Delta^{4,6}$ - pregnadiene-3,20-dione.

3. A compound according to claim 1 designated 6-fluor - 1,2α; 16,17α - bismethylene - $\Delta^{4,6}$ - pregnadiene-3,20-dione.

4. A pharmaceutical composition in unit dosage form comprising a compound according to claim 1, and a pharmaceutical diluent.

5. A pharmaceutical composition according to claim 4 comprising from 0.1–10 mg. of said compound, in a form adapted for oral administration.

6. A pharmaceutical composition according to claim 4 comprising from 1–20 mg. of said compound in a form adapted for parenteral administration.

7. A method for the treatment of gynecological disorders such as dysmenorrhea, amenorrhea, endometriosis, glandular-cystic hyperplasia, cycle abnormalities and functional sterility and disorders associated with the climacteric which comprises administering to a patient a therapeutically effective amount of a pharmaceutical composition according to claim 4.

8. A process for preparing a compound according to claim 1, which comprises subjecting 1,2α-methylene-$\Delta^{4,6,16}$-pregnatriene - 3,20 - dione to a methylenating reaction, treating the recovered 1,2α;16,17α-bismethylene compound with a percarboxylic acid to epoxidize the $\Delta^6$-double bond and subjecting the 6,7α-oxido compound formed where (a) R designates a member selected from the group consisting of chlorine, bromine and iodine to a treatment with the corresponding hydrohalic acid under simultaneous splitting of both cyclopropane rings and the epoxide ring to produce the 1α,16α-bis(halomethyl)-6-halo- $\Delta^{4,6}$-3-keto compound, (b) R designates fluorine, to a treatment with hydrofluoric acid to produce the 6β-fluor-7α-hydroxy-1,2α;16,17α-bismethylene intermediate and reacting the intermediate with a member selected from the group consisting of hydrochloric, hydrobromic and hydroiodic acids whereby the 7α-hydroxy group is eliminated, converting the resulting compound into the 1α,16α-bis(halomethyl)-6-fluor-Δ$^{4,6}$-3-keto compound and thereafter treating the 3-keto compound with a base whereby the 1α- and 16α-halomethyl groups are closed to form cyclopropane rings.

9. Process according to claim 8 wherein said 1α,16α-bis(halomethyl) compounds are treated with an inorganic base in an organic solvent to thereby form the 1,2α;16,17α-bismethylene compound.

References Cited
UNITED STATES PATENTS 3,127,396   3/1964   Wiechert et al. ____ 260—239.5

HENRY A. FRENCH, *Primary Examiner.*

U.S. Cl. X.R.

260—239.5, 239.55, 397.3, 397.4, 999